United States Patent [19]

Him et al.

[11] Patent Number: 4,729,162

[45] Date of Patent: Mar. 8, 1988

[54] ELECTROCHEMICAL CELL ASSSEMBLY

[75] Inventors: James H. Him, Burlington; Fred J. Berkowitz, Westford; Terrence F. Reise, Sudbury; John D. Sillesky, Norfolk, all of Mass.

[73] Assignee: Duracell Inc., Bethel, Conn.

[21] Appl. No.: 873,248

[22] Filed: Jun. 11, 1986

[51] Int. Cl.⁴ .............................................. H07M 6/00
[52] U.S. Cl. .................................. 29/623.3; 29/623.4; 156/250; 156/252; 156/257
[58] Field of Search ............................ 29/623.3–623.5; 156/250, 252, 254, 257

[56] References Cited

U.S. PATENT DOCUMENTS

| | | | |
|---|---|---|---|
| 2,688,581 | 9/1954 | Gtubbs | 156/252 X |
| 2,955,146 | 10/1960 | Vogt | 29/623.5 |
| 3,909,330 | 9/1975 | Schmerund | 156/257 X |
| 4,049,882 | 9/1977 | Beatty | 429/178 X |
| 4,106,962 | 8/1978 | Adams et al. | 156/252 X |

Primary Examiner—Brian E. Hearn
Assistant Examiner—Stephen J. Kalafut
Attorney, Agent, or Firm—Ronald S. Cornell; James B. McVeigh

[57] ABSTRACT

This invention pertains to an improved means of making electrical and mechanical contact to metal foil electrode in an electrochemical cell. A conductive element is used which has a multiplicity of teeth projecting therefrom. The teeth pierce through the metal foil electrode and are bent over to be flush with the electrode surface. A strong mechanical and electrical bond results.

4 Claims, 4 Drawing Figures

U.S. Patent    Mar. 8, 1988    4,729,162
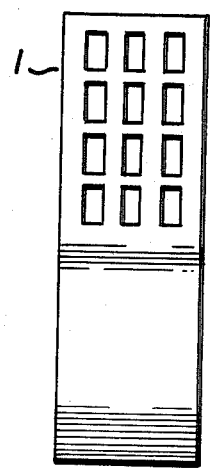
FIG. 1
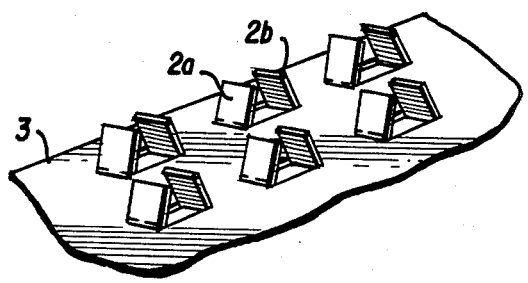
FIG. 2
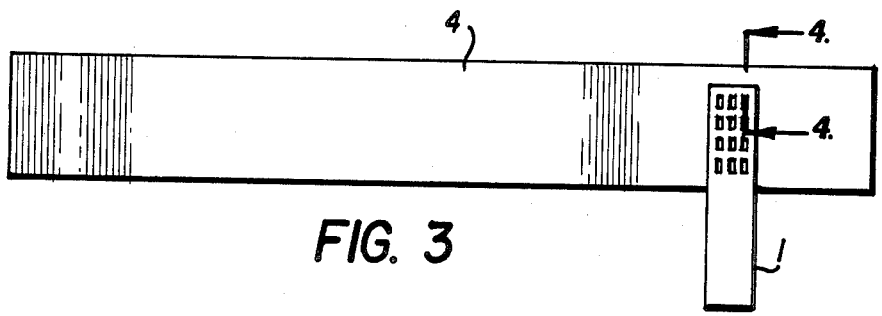
FIG. 3
FIG. 4
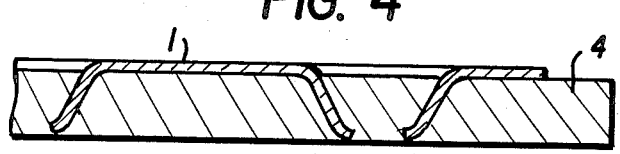

ELECTROCHEMICAL CELL ASSSEMBLY

The invention pertains to sealed electrochemical cells having spirally wound electrodes. More particularly it relates to an improved method and article for making mechanical and electrical contact to an electrode that is comprised of a metal foil and to an electrochemical cell utilizing the improved article.

It is conventional practice in the manufacture of batteries to affix one or more conductive elements or tabs of electrically conductive material to each of the electrodes. While one end of the tab is connected to an electrode the other end of the tab is connected to the appropriate terminal location on the housing of the battery.

High energy density electrochemical cells employ long thin electrodes which are spirally wound together in jelly roll fashion. One of these electrodes is often comprised of a metal foil. For example, in a $Li/MnO_2$ cell the lithium electrode is simply a strip of lithium foil with a typical thickness from between 0.005"(0.13 mm) to 0.020"(0.51 mm). Since such metals are electrically conductive it is generally unnecessary to have a conductive metal support such as used with pressed powder or porous sintered electrodes.

It is often desirable to connect a tab of electrically conductive material to these metal foil electrodes in order to provide contact to the appropriate terminal on the housing of the electrochemical cell. A variety of means could be used for attaching the tab to the foil electrode. These means would include welding, soldering, or cold welding. When the foil is a metal such as lithium, welding is not very desirable. Since lithium melts at 186° C., it would be difficult to weld a higher melting metal such as stainless steel or nickel. Soldering is also not very desirable due to the chance of contamination by the joining metal. Cold welding is perhaps the best choice of means of attachment. However the problem with cold welding, particularly with metal foil anodes, is that the tab can become separated from the anode during high rate discharge. If a tab is just cold welded on the surface it is subject to becoming separated when the anode material around it and beneath it is utilized during discharge.

U.S. Pat. No. 4,049,882 discloses a tab design for cold welding tabs to pressed powder electrodes or porous sintered electrodes. This patent discloses the use of circular perforations in the tab material wherein each perforation is surrounded by a collar of jagged projections. These projections are designed to be pressed into a pressed powder electrode and into contact with the support grid. However, this design has disadvantages for making contact to a foil electrode. Since the foil electrodes of this invention do not have a support grid there is nothing to stop these projections from punching right through the foil electrode. If this happened each set of these projections would punch out a circle of the foil and the tab could easily be pulled away. Further, the projections could punch through both the foil electrode and separator and short out to the other electrode.

This invention provides an improved design of a tab that can be firmly attached to a foil electrode. Generally speaking this invention provides a conductive element or tab having regularly shaped teeth in a predetermined section which are longer than the thickness of the foil electrode. These teeth are designed so that they punch through the foil electrode and are then bent towards each other when pressed between plates to a fixed stop. The end result is that the teeth are bent so as to be flush with the electrode surface and in the process actually grab the metal foil from behind. In this fashion this tab design makes electrical contact to both sides of the metal foil anode and therefore remains in contact with the anode throughout the discharge, thus overcoming the problem associated with cold welding tabs to metal foil anodes.

The features and advantages of the present invention will be explained with reference to the drawings in which:

FIG. 1 is a top view of a tab having an array of rectangular apertures in a predetermined section formed in accordance with this invention.

FIG. 2 is a three dimensional view of a portion of the bottom of the tab showing how the teeth project from the opposite ends of each of the apertures.

FIG. 3 is a top view of a metal foil anode showing how a tab made in accordance with this invention would be located on the surface of an anode.

FIG. 4 is a cross section view taken along line 4—4 in FIG. 3. The figure shows how the teeth are bent together as well as how they are flush with the back surface of the anode.

Referring now to FIG. 1, a strip of tab stock material 1 has a multiplicity of rectangular holes 2 therein. One dimension of these rectangular holes is made to be greater than twice the thickness of the metal foil onto which the tab will be attached. One presently preferred method for forming the apertures is to use a chisel punch and die arrangement such that two teeth, 2a and 2b, rectangular or otherwise are formed from the material punched from each hole as shown in FIG. 2. This embodiment results in teeth having lengths the sum of which is approximately equal to the length of the aperture. Each tooth should be longer than the thickness of the metal foil and each tooth should extend from the tab substrate at an angle not greater than 90° with the tab substrate 3. The teeth project from the same side of the strip, with each being attached by its base to opposite ends of the aperture. While the described embodiment is presently preferred there could be more than one tooth formed at the opposite ends of the aperture. The teeth are located on a first predetermined section of the tab while a second predetermined section of the tab without teeth is used to weld to the housing of the cell.

The strip of tab material 1 having rectangular holes and teeth may be advantageously positioned on the surface of the metal foil anode 4 in the manner shown in FIG. 3. It is preferred that the teeth are first pressed through and then peened over in a single operation. This is accomplished by placing the tab onto the foil surface with the teeth side down. This assembly is then pressed to a fixed stop between two plates. The fixed stop distance is preferably equal to the thickness of the foil plus the thickness of the tab stock. If the fixed stop is less than this the tab stock is actually pressed into the foil which detrimentally thins the foil. If the fixed stop is greater than this the teeth will not adequately be bent to be flush with the electrode surface. FIG. 4 is a cross section through a pair of teeth in the tab 1 showing how they grasp the anode 4 after being pressed to a fixed stop.

Although the figures depict an array of apertures arranged in three rows of four each, and this arrangement is especially suitable for adequately securing a tab to a thin lithium anode foil, the number and array of projections may be varied depending on the specific nature of the anode and tab materials and their dimensions. They can be arranged in a rectangular array as shown in FIG. 1 or in any array which may be more suitable for a given application. Further, the teeth can be other than rectangular in shape and still operate within the scope of this invention. For example, triangular shaped teeth could be formed and might even be preferable for piercing through metals that are harder than lithium.

The effectiveness of the connection of the tab to the anode can be determined by discharging the cell and observing its voltage profile. If the connection is good, the discharge is smooth without any sharp breaks or discontinuities. If the connection is not good the tab may become disengaged from the anode during discharge in which case there will be a sharp break or discontinuity in the voltage profile. The effectiveness of the tab design of this invention was tested in this fashion and is fully described in the following example.

EXAMPLE 1

An anode tab is made according to the teachings of this invention from ¾ hard nickel tab stock. The tab is 1.3"(33 mm) long, 0.25"(6.4 mm) wide, and 0.002"(0.05 mm) thick. A 3×12 array of rectangular holes is punched into the tab. The dimensions of each hole is 0.025"(0.64 mm)×0.025"(0.64 mm). The teeth formed are 0.012"(0.32 mm) long, and at an angle of 80° with the tab substrate. The gap between the projecting ends of the teeth is 0.008"(0.20 mm). The tab is pressed into a lithium foil anode of dimensions 10.25"(260 mm) long, 0.90"(22.9 mm) wide, and 0.006"(0.15 mm) thick. The tab described above is pressed onto the anode to a fixed stop of 0.008"(0.20 mm). This is accomplished by placing the lithium foil onto a smooth steel surface. The tab is then placed on top of the lithium foil with the toothlike projections facing toward the lithium foil. The tab is then pressed down by a flat metal plate until the distance between the steel surface and the flat metal plate was 0.008". The gap between the tooth-like projections closes from the original 0.008"(0.20 mm) before pressing to a final gap of about 0.004"(0.10 mm).

The lithium foil anode with the above described tab attached is combined with an $MnO_2$ cathode and a microporous polypropylene separator. The anode and cathode are spirally wound together with the separator interposed therebetween. This spirally wound assembly is inserted into a metal casing, and the protruding end of the anode tab welded to the casing. The cell is filled with a non-aqueous electrolyte, and a cover attached to the top of the cell.

Four cells are made in accordance with the above description. They are each discharged across a resistance of 8 ohms giving smooth and uniform voltage profile curves which demonstrates that the tab remained in good electrical contact throughout the discharge.

While this example describes teeth having a width greater than length other widths and lengths could be used without affecting the operability of the invention. In some instances it might be desirable to have the teeth longer than they are wide. In addition, this example describes teeth the sum of whose lengths is equal to the length of the aperture. It might be desirable to have shorter teeth so that the sum of their lengths is less than the length of the aperture. While the example describes a tab having 36 apertures a significantly fewer number of apertures could be used. It is possible that for some applications a single aperture with teeth would be sufficient for forming a mechanical and electrical bond.

While this example describes the use of a single tab attached to the anode it would be possible to attach multiple tabs thereto. Although the example had an anode comprised of lithium other suitable foil electrodes would include aluminum, sodium, potassium, magnesium, calcium, other alkali or alkaline earth metals, and alloys thereof.

While this example described a cell using a cathode comprised of $MnO_2$, other cathode materials could be used. Suitable cathode materials include $CFx$, $V_2O_5$, $WO_3$, $MoO_3$, $MoS_2$, lead oxides, cobalt oxides, copper oxides, $CuS$, $CuS_2$, $In_2O_3$, iron sulfides, $NiS$, $Ag_2CrO_4$, $Ag_3PO_4$, $TiS_2$, transition metal polysulfides, and mixtures thereof.

In addition to the tab material being made from nickel other suitable materials would include steel, stainless steel, aluminum, copper, or titanium.

What is claimed is:

1. A method for making electrical contact to a foil electrode of an electrochemical cell comprising the steps of punching an array of apertures in a predetermined section of a rectangularly shaped conductive element; forming at least one pair of opposed teeth from the material punched from each aperture such that the teeth project from the same side of the conductive element, are longer than the thickness of the foil electrode, and are directed toward each other; pressing the conductive element into the surface of the foil electrode such that the teeth pierce through the electrode; and bending the teeth toward each other until they are flush with the opposite surface of the electrode.

2. The method of claim 1 wherein the the teeth are concomitantly pressed through the foil electrode and bent over by compressing the conductive element and metal foil electrode combination between metal plates to a fixed stop distance.

3. The method of claim 1 wherein the fixed stop distance is equal to the sum of the thicknesses of the foil electrode and of the conductive element.

4. A method for making electrical contact to a foil electrode of an electrochemical cell comprising the steps of punching an array of apertures in a predetermined section of a rectangularly shaped conductive element; forming at least one pair of teeth from the material punched from each aperture such that the teeth project from the same side of the conductive element; pressing the conductive element teeth first onto and through a first surface of the foil electrode and into the thickness thereof; and forcing the material of the foil electrode to flow past and behind the teeth to hold the conductive element in good electrical and mechanical contact with the foil electrode.

* * * * *